US 6,669,152 B2

(12) United States Patent
Hernandez

(10) Patent No.: US 6,669,152 B2
(45) Date of Patent: Dec. 30, 2003

(54) PORTABLE PINATA SUPPORT FRAME

(76) Inventor: Arturo Hernandez, 505 N. Stoneman #1, Alhambra, CA (US) 91801

( * ) Notice: Subject to any disclaimer, the term of this patent is extended or adjusted under 35 U.S.C. 154(b) by 118 days.

(21) Appl. No.: 09/971,266

(22) Filed: Oct. 3, 2001

(65) Prior Publication Data

US 2003/0062454 A1 Apr. 3, 2003

(51) Int. Cl.[7] .............................................. F16M 11/24
(52) U.S. Cl. ..................... 248/165; 248/163.2
(58) Field of Search ....................... 248/163.2; 273/400, 273/457, 445; 434/256, 365; 446/5, 69; 473/429, 428, 478; 224/154

(56) References Cited

U.S. PATENT DOCUMENTS

| | | | | |
|---|---|---|---|---|
| 2,591,362 A | * | 4/1952 | Koch | |
| 3,830,494 A | * | 8/1974 | Biskup | 273/26 E |
| 4,334,612 A | * | 6/1982 | Beato | 206/314 |
| 4,832,337 A | * | 5/1989 | Estrada | 273/1 G |
| 4,862,906 A | * | 9/1989 | Jordon | 135/95 |
| 4,884,658 A | * | 12/1989 | Banfield | 182/129 |
| 5,211,288 A | * | 5/1993 | Beall | 206/577 |
| 5,221,089 A | * | 6/1993 | Barrett | 273/187.2 |
| 5,319,874 A | * | 6/1994 | Vance | 206/315.1 |
| 5,562,115 A | * | 10/1996 | Sotelo | 135/156 |
| 5,823,895 A | * | 10/1998 | Rasic | 473/430 |
| 5,954,600 A | * | 9/1999 | Gill | 473/478 |
| 6,209,878 B1 | * | 4/2001 | Munro | 273/400 |
| 6,412,736 B1 | * | 7/2002 | Zaragoza | 248/125.8 |

* cited by examiner

*Primary Examiner*—Gwendolyn Baxter
(74) *Attorney, Agent, or Firm*—Sheldon & Mak; Denton L. Anderson

(57) ABSTRACT

A portable support frame kit suitable for suspending a pinata. The portable support frame kit has a support frame component carrying case with a maximum length less than about 120 inches and a maximum external volume less than about 10 cubic feet. The kit also has a plurality of support frame components disposed within a carrying case. The support frame components are assemblable into a free-standing support frame having a height above the ground between about 5 feet and about 25 feet. Each of the plurality of support frame components is shorter in length than about 120 inches, and the combined weight of the support frame kit is less than about 175 pounds.

20 Claims, 2 Drawing Sheets

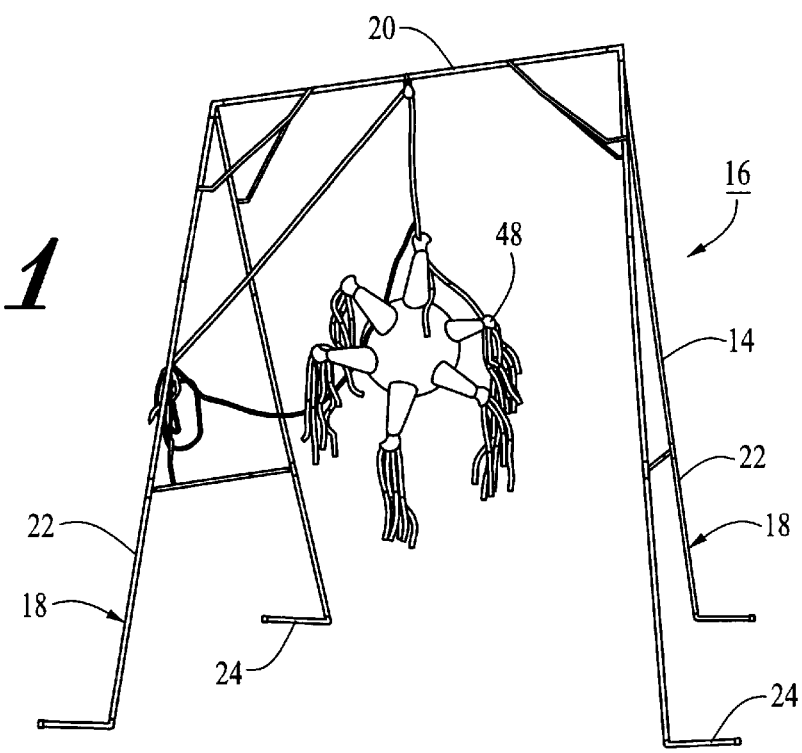
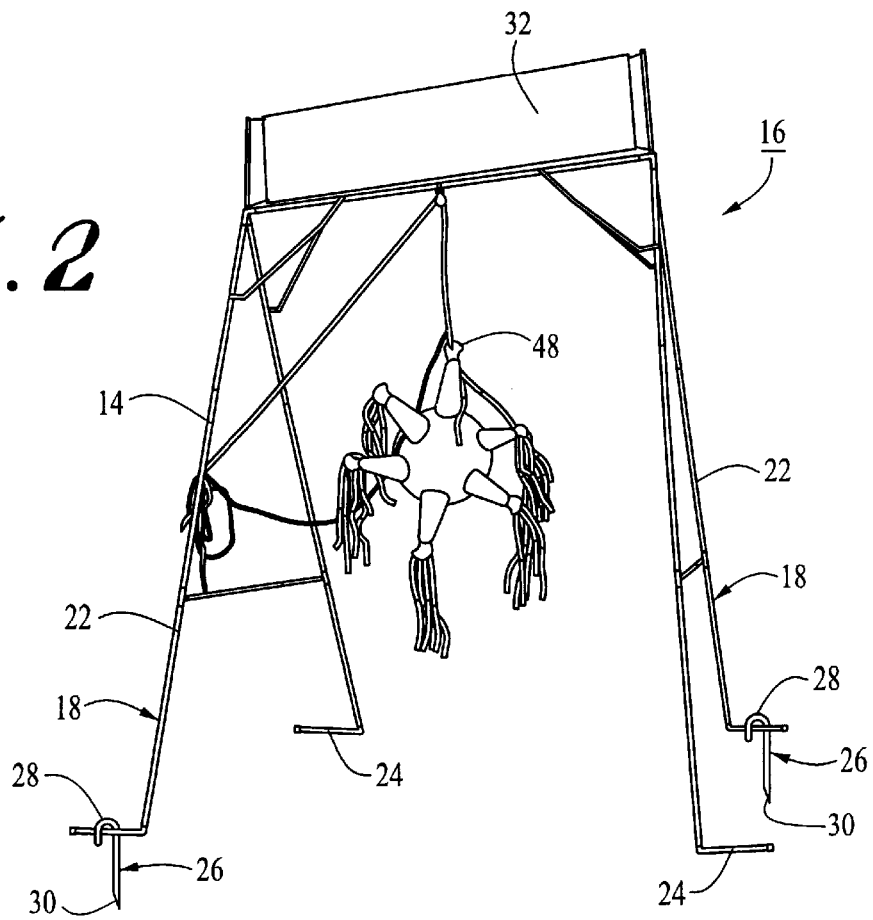

PORTABLE PINATA SUPPORT FRAME

FIELD OF THE INVENTION

This invention relates generally to entertainment products, such as pinatas and, more particularly, to a support frame kit suitable for suspending a pinata.

BACKGROUND OF THE INVENTION

Use of pinatas as party entertainment, especially for young children, has become very popular. The use of the pinata requires that the pinata be properly supported several feet above the ground. This can be a problem for party givers who do not have a backyard tree with a convenient low-hanging limb. It is especially a problem for traveling professional party consultants who prepare pinatas and organize pinata-breaking entertainment.

Accordingly, there is a need for a portable free-standing pinata support frame which can be easily assembled and disassembled.

SUMMARY

The invention satisfies this need. The invention is a portable support frame comprising (a) a support frame component carrying case having a maximum length less than about 120 inches and having a maximum external volume less than about 10 cubic feet, and (b) a plurality of support frame components disposed within the support frame component carrying case, the plurality of support frame components being assemblable into a free-standing support frame having a height above the ground of between about 5 feet and about 25 feet, each of the plurality of support frame components being no longer in length than about 120 inches. In the invention, the combined weight of the kit is less than about 175 pounds.

DRAWINGS

These features, aspects and advantages of the present invention will become better understood with regard to the following description, appended claims and accompanying figures where:

FIG. 1 is a perspective view of a combination having features of the invention comprising a portable support frame and a pinata;

FIG. 2 is a second perspective view a combination having features of the invention;

DETAILED DESCRIPTION

Figure 3:
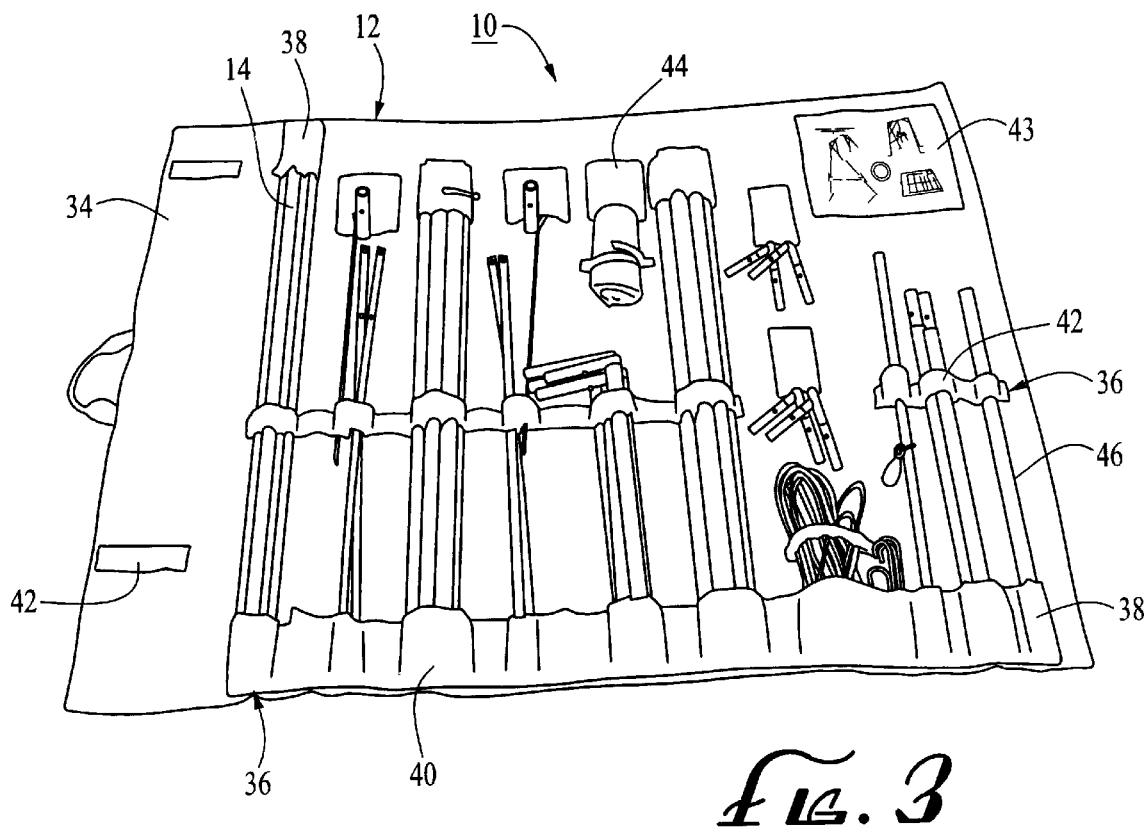
FIG. 3 is a perspective view of a portable support frame kit having features of the invention, the kit being shown in an unrolled state.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a portable support frame kit 10 comprising a support frame component carrying case 12 and a plurality of support frame components 14. The plurality of support frame components 14 are assemblable into a free standing support frame 16 having a height above the ground between about 5 feet and about 15 feet. The support frame components 14 are conveniently and easily stored and transported within the carrying case 12.

As illustrated in FIGS. 1 and 2, the support frame 16 has at least one generally vertical member 18 and at least one generally horizontal member 20. In the embodiment illustrated in FIGS. 1 and 2, the at least one generally vertical member 18 is provided by a pair of A-shaped side members 22 and the at least one horizontal member 20 is provided by a single cross beam. The horizontal member 20 typically has a length between about 60 inches and about 120 inches. To allow proper clearance between the two side members 22, it is preferred that the horizontal member 20 have at least one portion spaced apart from both side members 22 by a distance of at least about 30 inches.

Each of the support frame components 14 is no longer than about 80 inches, preferably no longer than about 60 inches. In the embodiment illustrated in the drawings, each of the support frame components 14 are attachable to adjacent support frame components 14 by press-fit. Other methods of attaching the support frame components 14 to one another can also be used.

In the embodiment illustrated in FIGS. 1 and 2, the support frame 16 comprises four flat-surface base members 24 for maintaining the stability of the support frame 16 on a flat surface.

As illustrated in FIG. 2, the support frame kit 10 can further comprise at least a pair of hold down stakes 26 which can be used to firmly retain the support frame 16 on a lawn or other soft surface. In the embodiment illustrated in FIG. 2, such hold down stakes 26 can comprise a simple stake with a loop 28 at one end and a point 30 at the other end.

Also as illustrated in FIG. 2, the support frame 16 can further comprise an informational or advertising sign 32 disposed across the generally horizontal member 20.

The carrying case 12 has a maximum length of less than about 120 inches, typically less than about 80 inches, and has a maximum external volume of less than about 10 cubic feet, typically less than about 5 cubic feet. In the embodiment illustrated in FIGS. 3 and 4, the carrying case 12 is provided by a flexible sheet 34 having a width between about 50 inches and about 80 inches and a length between about 60 inches and about 100 inches. When all of the support frame components 14 are disposed within the carrying case 12 illustrated in FIG. 3, the carrying case 12 is rollable into the general shape of a right circular cylinder having an external volume which is typically between about 2 cubic feet and about 10 cubic feet, most typically between about 2 cubic feet and about 5 cubic feet, and preferably less than about 2.5 cubic feet. In the embodiment illustrated in FIG. 4, the carrying case 12 has an external diameter of about 9 inches, a length of about 56 inches and an external volume of about 2.1 cubic feet.

The combined weight of the carrying case 12 and the support frame components 14 within the kit 10 is less than about 175 pounds, preferably less than about 75 pounds, and most preferably less than about 60 pounds.

Figure 4:
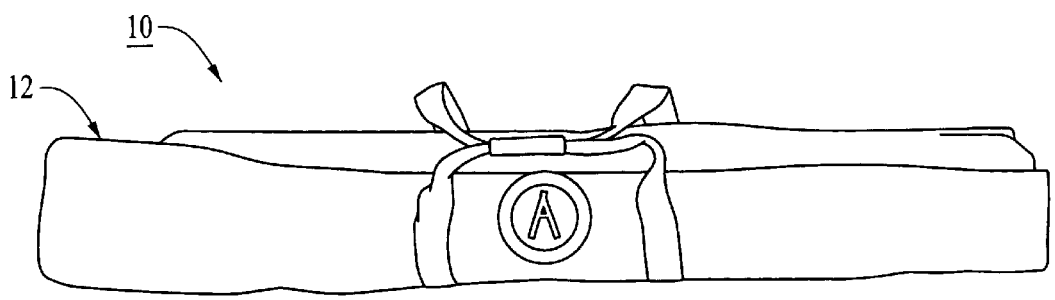
FIG. 4 is a perspective view of the kit illustrated in FIG. 3, shown in a fully rolled state.

As illustrated in FIG. 3, the flexible sheet 34 has a plurality of retainment members 36 for retaining the plurality of support frame components. In the embodiment illustrated in FIG. 3, such retainment members 36 comprise a plurality of pockets 38 and a plurality of straps 40 connectable by hook and loop fasteners. In the embodiment illustrated in FIG. 3, it can be seen that the flexible sheet is held together in the cylindrical shape illustrated in FIG. 4 by retainment straps 42 hook and loop fasteners, as well.

Preferably, the carrying case 12 further comprises a built-in set of directions 43 illustrating how to assemble the support frame components 14 into the free-standing support frame 16.

Preferably, the plurality of support frame members 14 are color-coded. For example, each like support frame component 14 can be painted with a different color. Such color-coding facilitates the assembly and storage of the support frame components 14.

Preferably, the kit 10 further comprises flexible bags 44 for use in the creation of sand bags which can be used to hold down the flat-surface base members 24 when the support frame 16 is disposed on a hard, flat surface, such as a concrete surface.

It is also preferable that the kit 10 further comprises a pinata striking stick 46 made from a plastic or wood and having a length between about 2 feet and about 4 feet.

As illustrated in FIGS. 1 and 2, the portable support frame 16 can be conveniently used to support a pinata 48 suspended from the generally horizontal member 20.

Although the description above contains many specifications, these should not be construed as limiting the scope of the invention but as merely providing illustrations of some of the presently preferred embodiments of this invention.

What is claimed is:

1. A portable support frame kit comprising:
   (a) a support frame component carrying case having a maximum length less than about 120 inches and having a maximum external volume less than about 10 cubic feet; and
   (b) a plurality of support frame components disposed within the support frame component carrying case, the plurality of support frame components being assemblable into a free-standing support frame having a height above the ground of between about 5 feet and about 25 feet, each of the plurality of support frame components being no longer in length than about 120 inches;
   wherein the kit has a combined weight which is the weight of the support frame component carrying case plus the weight of the plurality of support frame components; and
   wherein the combined weight of the kit is less than about 175 pounds.

2. The portable support frame kit of claim 1 wherein the support frame component carrying case has a maximum length less than about 80 inches and has a maximum external volume less than about 5 cubic feet, wherein the plurality of support frame components are assemblable into a free-standing support frame having a height above the ground of between about 5 feet and about 15 feet, wherein each of the plurality of support frame components is no longer in length than about 80 inches and wherein the combined weight of the kit is less than about 75 pounds.

3. The portable support frame kit of claim 1 wherein the free-standing support frame has at least one generally vertical member and at least one generally horizontal member.

4. The portable support frame kit of claim 3 wherein the at least one generally horizontal member has at least one portion which is spaced apart from the at least one generally vertical member by a distance of at least about 30 inches.

5. The portable support frame kit of claim 1 wherein the free-standing support frame comprises a pair of side members spaced apart by the at least one generally horizontal member.

6. The portable support frame kit of claim 5 wherein the side members are A-shaped.

7. The portable support frame kit of claim 1 wherein the support frame component carrying case comprises a flexible sheet with retainment members for retaining the plurality of support frame components, the flexible sheet being rollable into the general shape of a right circular cylinder having an external volume less than about 5 cubic feet.

8. The portable support frame kit of claim 7 wherein the retainment members comprise a plurality of pockets.

9. The portable support frame kit of claim 7 wherein, when the flexible sheet is disposed in a roll having an external volume less than about 5 cubic feet, one portion of the flexible sheet is attached to a second portion of the flexible sheet such that the roll does not unroll.

10. The portable support frame kit of claim 9 wherein the one portion of the flexible sheet is attached to the second portion of the flexible sheet by hook and loop fasteners.

11. The portable support frame kit of claim 1 wherein the maximum length of the support frame component carrying case is less than about 60 inches.

12. The portable support frame kit of claim 1 wherein the maximum external volume of the support frame component carrying case is less than about 2.5 cubic feet.

13. The portable support frame kit of claim 1 wherein each of the plurality of support frame components is no longer than about 60 inches in length.

14. The portable support frame kit of claim 1 wherein the combined weight of the kit is less than about 60 pounds.

15. The portable support frame kit of claim 1 wherein the plurality of support frame components are attachable to one another by press fit.

16. The portable support frame kit of claim 1 wherein the plurality of support frame components further comprises at least one pair of flat-surface base members.

17. The portable support frame kit of claim 1 wherein the plurality of support frame components further comprises a pair of hold down stakes.

18. The portable support frame kit of claim 1 wherein the plurality of support frame components are color-coded.

19. The portable support frame kit of claim 1 further comprising a pinata stick.

20. A combination comprising (i) a free-standing support frame assembled from the kit of claim 1 and (ii) a pinata suspended from the support frame.

* * * * *